Aug. 9, 1932.  J. L. SHROYER  1,871,393
OVEN
Filed April 1, 1929
Fig. 1.
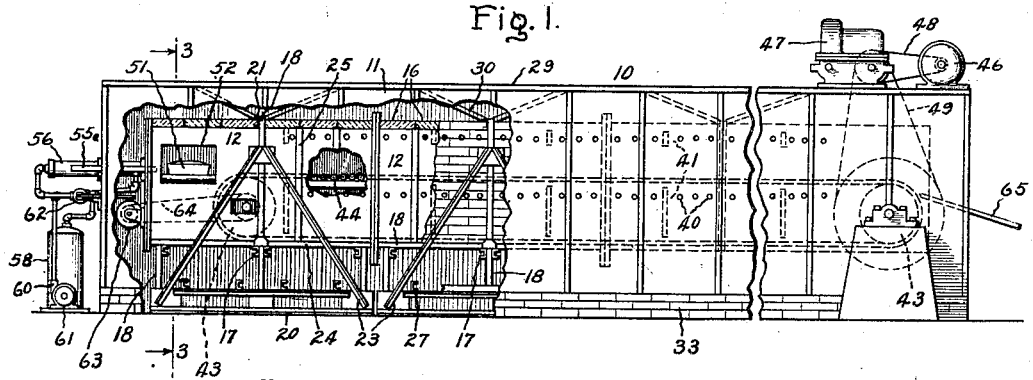
Fig. 2.
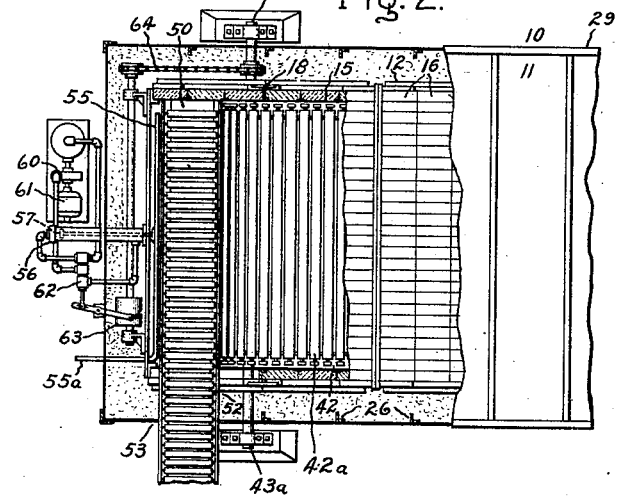
Fig. 4.
Fig. 5.
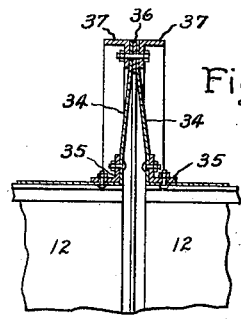
Fig. 3.
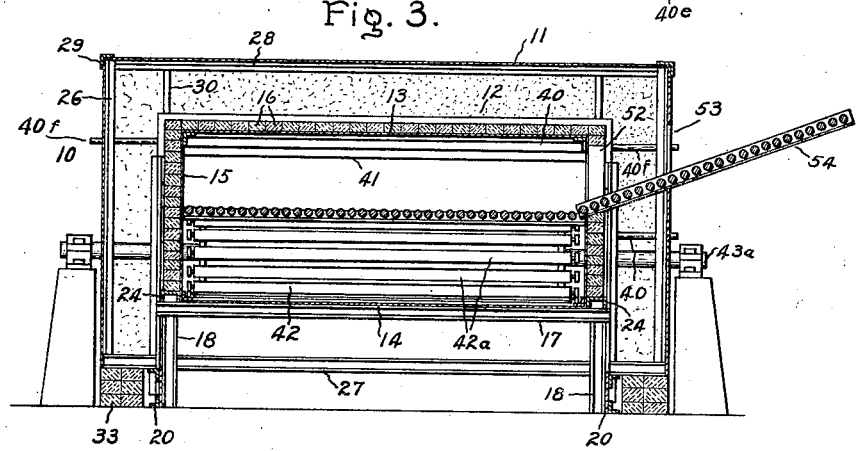
Inventor
Jacob L. Shroyer,
by Charles E. Tullar
His Attorney.

Patented Aug. 9, 1932

1,871,393

UNITED STATES PATENT OFFICE

JACOB L. SHROYER, OF OAK PARK, ILLINOIS, ASSIGNOR TO EDISON ELECTRIC APPLIANCE COMPANY, OF CHICAGO, ILLINOIS, A CORPORATION OF NEW YORK

OVEN

Application filed April 1, 1929. Serial No. 351,693.

My invention relates to ovens, more particularly to ovens of the continuous working or conveyor type, and has for its object the provision of a simple, reliable, and efficient oven of this character.

Although my invention is not limited thereto, it has particular application in the electrical industrial cooking operations, as for instance, those involving the production of bread, pies, pastries, cereals and like food products.

Industrial cooking operations require a very close temperature control and a very uniform distribution of heat. Thus it is necessary in order to afford protection against over or under cooking, burning and the frequent wasting of food that there be a uniform distribution of heat, an absence of excessive localized heat and an accurate thermal control. My invention in one of its aspects, therefore, contemplates the provision of an oven so constructed that it will inherently permit a close and accurate temperature control and will provide a uniform distribution of heat.

In addition to the requirements with respect to the heat control and distribution, it is necessary for the production of maximum output and satisfactory operating costs, that the oven conveyor be quickly and safely loaded. Another aspect of my invention, therefore, is the provision of improved conveying means for the oven whereby the articles may be quickly and safely loaded upon the conveyor with a minimum of labor and skill on the part of the attendant.

Moreover, as will be readily understood, considerable linear expansion will be encountered in the operation of ovens, particularly in the operation of metal lined ovens of relatively great length. My invention also contemplates the provision of means for absorbing the thermal expansion of the oven walls.

In carrying my invention into effect in one form thereof, I position a plurality of heating units both above and below the path of movement of the conveyor, which will be employed to carry the articles through the oven, and throughout substantially the entire length of this path of movement. The heating units will be placed comparatively close to each other so as to provide a practically uniform distribution of heat. Each heating unit, preferably, will comprise an inverted supporting channel secured to the oven walls, and a suitable resistance unit mounted within the inverted channel.

In order to insure accurate heat regulation, I provide baffles positioned so as to reduce the circulation of air within the oven. Moreover, I provide the oven with an inner heating chamber which will be supported independently of the outer linings or casing so that the heat losses from the heating chamber through to the outer casing will be reduced to a minimum. Thus the arrangement of the heating units and baffle structure together with the reduction of heat losses from the heating chamber practically eliminates any possibility of localized heat and insures a uniform heat distribution wthin the oven.

Moreover, to further increase the efficiency of operation, I provide improved conveying means for the articles whereby the articles may be rapidly and safely introduced into the oven. To this end, I introduce the articles by gravity action and force them from the loading to the main conveyor by means of a fluid pressure operated push bar. This bar will be arranged so that when it is being operated, it will prevent the introduction of more articles into the oven. However it may be that an article will be caught between the bar and the oven feeding opening when the bar starts forward to force the articles onto the main conveyor. In order to insure that no damage will result, I provide a fluid operating motor for the bar, the motor being supplied by pressure from a centrifugal pump, the maximum pressure of which may be suitably limited.

Preferably, the oven will comprise a plurality of abutting oven chambers. In order to absorb the thermal expansion of these chambers, I provide expansion absorbing means which will be located preferably between each pair of abutting chambers.

For a more complete understanding of my invention, reference should be had to the accompanying drawing in which Fig. 1 is an elevation of an oven embodying my invention, portions of the oven being broken away to illustrate certain structural details; Fig. 2 is a plan of a portion of the oven, certain portions of the oven being broken away to illustrate certain structural details; Fig. 3 is a section of the oven taken through the line 3—3 of Fig. 1; Fig. 4 is a section of certain structural details of the oven chambers, and Fig. 5 is a section of one of the heating units employed in the oven.

Referring to the drawing, I have shown my invention in one form in connection with a conveyor or continuous working oven provided for industrial cooking operations, as for instance those involving the production of bread, pies and like food products.

As shown, the oven 10 comprises outer metallic walls, forming an outer lining or casing 11 and inner metallic walls forming a plurality of abutting oven or heating chambers 12, spaced from the outer casing 11.

The oven chambers 12 are of identical construction. Thus, each chamber will be defined by an upper wall 13 (Fig. 3), a bottom wall 14 and side walls 15. It will be understood that all of these walls will be suitably heat insulated. To this end, slabs of rock wool 16, packed to the proper density, will be placed so as to completely cover the top and side walls of the chambers. Preferably the entire space between the inner and outer walls will be packed with loose rock wool.

The heating chamber which comprises the chambers 12 will be provided with a suitable supporting structure, preferably of metallic skeleton framework. Thus, each oven chamber 12 is provided with a skeleton framework which comprises a plurality of supporting beams 17 spaced longitudinally and positioned crosswise beneath the oven chamber. As shown, four of these beams will be provided for each chamber. These beams 17, in turn, will be supported by a plurality of longitudinally spaced columns 18 to which they will be secured by some suitable means, as by rivets. As shown, in Figs. 1 and 3, three of these columns 18 will be placed on each side of the oven chamber, the intermediate columns, positioned upon opposite sides of the oven, serving to support the two intermediate beams 17.

The entire framework is strengthened by means of a pair of base members 20, one of which will be placed upon either side of the oven chamber so as to secure the lower ends of the columns 18. It will be understood that the lower ends of these columns will be welded or otherwise suitably secured to the base members. Moreover, a horizontal beam 21 will be positioned crosswise above the chamber approximately at its longitudinal center, this beam being supported at its ends by means of the intermediate columns 18, which will be of a height sufficient to receive the ends of the beam. The upper end of each intermediate column 18 will be suitably supported by a pair of strut members 23. As shown, these members will serve to support the upper end of their column 18 from the girder or base member 20. Preferably these struts will be mechanically connected to the columns 18 and to the base members 20 by welding.

As shown (Figs. 1 and 3) the columns 18 will also serve to support a pair of suitable horizontally disposed beams 24, one of which will be located upon each side of the oven chamber. It will be understood that these beams will serve to support the insulating brickwork 16.

Thus, a very simple and yet very rigid and strong framework will be provided for each oven chamber. It will be understood that the oven chamber will be placed within this cradle-like framework and will be secured to the cradle at some point, preferably intermediate its ends. Thus, the chamber will be secured to the horizontal beams 17, which are located beneath the oven chamber at approximately its longitudinal center, and to the horizontal beam 21, which is located above the oven chamber at approximately at its longitudinal center. Otherwise, the chamber is free to move longitudinally in either direction from its secured portion so that each chamber will be entirely free to expand without restriction by its supporting structure. To further enhance the strength and rigidity of the construction of the oven, each oven chamber will be provided with a plurality of vertical stiffening ribs 25.

In order to support the outer metallic casing 11 independently of the oven chamber 12, I provide a suitable metallic skeleton framework which will have no mechanical connection with the oven chambers. Thus, I provide a plurality of columns 26 spaced longitudinally upon each side of the oven, these columns being supported by means of a plurality of horizontally disposed beams 27 which preferably will be supported crosswise of the oven by means of the base girders 20. By referring to Figs. 1 and 3, it will be observed that a plurality of these beams 27 will be spaced longitudinally upon the supporting members 20 so that each end of each beam will serve to support a column 26. It will be understood that the lower end of each column will be mechanically connected to the proper supporting beam in any suitable manner. The upper ends of the columns 26 upon one side of the oven will be connected mechanically to the corresponding columns upon the other side of the oven by means of cross beams 28, one of which will be provided for each pair of columns, and all of the columns upon the same side of the oven chamber will be interconnected mechanically by longitudinally extending beams 29.

To enhance the rigidity of this structure, suitable stay rods 30 will serve to interconnect the outer skeleton framework with the intermediate vertical columns 18 provided for each of the inner skeleton frameworks. It will be understood that the metallic walls forming the outer casing will be secured to this framework in any suitable manner as by rivets. Thus, a very rigid metallic skeleton framework will be provided for the outer metallic linings so as to support the linings substantially independent of the inner metallic framework, the base members 20 and the stay rods 30 being the only members common to the two structures. Moreover, the outer metallic linings will be supported entirely independent of the inner metallic linings. This construction for independently supporting the inner and outer linings, together with the rock wool insulating material placed between the linings, practically prevents the dissipation of heat from the inner linings. Thus, this construction is conducive to a very uniform distribution of heat and an accurate temperature control. It will be understood that the inner metallic framework may be and preferably is packed with suitable loose rock wool so that for all practical purposes there will be no metallic contact between the inner linings and their supporting framework. It will also be understood that the vertical space formed between the lower edge of the outer metallic linings or casing 12 and the floor upon which the oven rests will be filled with some suitable brickwork construction 33, as for instance suitable brickwork provided with a facing of white enamel brick.

In order to absorb the linear expansion of the inner metallic linings, I provide suitable steam tight expansion joints between the abutting oven chambers. Thus, referring to Fig. 4, it will be observed that the oven chambers will be suitably spaced so that the free portions of each chamber may expand without interference from the abutting oven chambers. It will be understood that the length of these spaces provided between the chambers will depend upon the proportions of the chambers. Thus it has been found in some installations that a 5/8" space will be satisfactory. Each abutting end of the chambers will be provided with an outwardly projecting peripheral flange 34 which will be connected mechanically to the corresponding oven chamber by any suitable means. Thus, as shown, each flange may be connected to its oven chamber by means of suitable angle members 35 which will be bolted or rivted to the flanges and oven chamber. The outer edges of adjacent flanges will be provided with a steam tight joint so as to prevent the escape of steam to the space between the inner and outer linings and thus protect the heat insulating material surrounding the heating chambers. To this end a suitable gasket 36 will be positioned and secured between the outer edges of the flanges, which will be securely bolted together with a pair of metallic angle members 37, one of which will be placed on each side of the joint. These angle members serve to provide a very tight and mechanically dependable expansion joint for the oven chambers. Thus, the movement of the free portions of the chambers will be absorbed by the accordion-like pleated expansion joints.

In order to further insure a uniform distribution of heat, I provide a plurality of heating units 40 (Figs. 1 and 3) which will be spaced longitudinally within the oven chamber in close relation with each other. Preferably, the heating units will be placed both above and below the conveyor in substantially parallel rows so as to subject the articles being conveyed through the oven to a practically uniform source of heat.

Preferably each heating unit will comprise a single straight length of sheath wire construction such as described and claimed in the Abbott Patent No. 1,367,341, dated February 1, 1921. Thus, each of these straight heating units will comprise a straight outer metallic sheath 40a in which a heating helical resistor 40b is embedded in a suitable heat refractory insulating material 40c. Each unit will be slidably supported in an inverted supporting channel 40d (Fig. 5), which will be properly positioned crosswise from one side of the oven chamber to the other.

As shown, the unit 40 will be embraced by the channel member 40d and will be secured by means of a plurality of spaced cotter pins 40e, only one of which is shown. A pair of tubes or pipes 40f will be provided for each unit, one tube being positioned upon each side of the heating chamber and extending from the inner to the outer lining. Preferably these tubes will extend just beyond the outer lining of the oven so that proper terminal connections with the heating unit may be provided. It will be understood that the inner ends of each tube will be provided with a steam tight joint with the inner lining and the outer ends of the tube will be provided with a steam tight joint with its associated heating unit. Thus the construction not only provides an effective guide to facilitate the insertion and removal of the heating units but also serves to prevent the leakage of steam from the oven chambers into the insulation.

The uniformity of the heat distribution is further insured by suitable baffles 41 provided to reduce the circulation of air within the oven. As shown, the baffles 41 will be positioned both above and below the path of movement of the articles crosswise of the heating chamber. Preferably these baffles will be positioned in substantially vertical planes. It will be understood that any desired number of the baffles may be positioned within the oven chamber, the proportions of the particular installation and the desired refinement in the thermal control being the determining factors. It will be further understood that the baffles positioned above the conveyor will be adjustable vertically so that they can be set to clear products or pans of different heights.

The conveyor, which may be of any desired construction, is shown as comprising an endless belt 42 of suitable linked rollers 42a. The belt will be supported by means of a pair of pulleys 43, one being located substantially at each end of the oven, and by means of tracks 44 which will extend throughout the length of the conveyor so as to securely support those portions of the endless belt extending between the pulleys 43. It will be understood that each pulley 43 will be provided with suitable supporting bearings 43a. The conveyor will be provided with a suitable operating motor 46, which will be mechanically connected through suitable worm reduction and variable speed gearing mechanism 47 with one of the conveyor pulleys. Thus, the motor will be mechanically connected with the gear mechanism 47 by a chain drive 48 which in turn will be mechanically connected with the right hand conveyor pulley 45 by a chain drive 49.

In order to enhance the efficiency of operation of the oven, I provide suitable means for quickly and safely loading the conveyor 42. To this end I provide a suitable loading conveyor 50 located at the loading end of the oven and positioned crosswise of the oven so that the articles 51 may be introduced laterally into the oven. Thus, the articles will be introduced through suitable openings 52 and 53 provided in the inner and outer linings respectively. Preferably, the articles 51 will be introduced through these openings by gravity means. Thus, referring to Fig. 3, it will be observed that the articles which will have been placed upon the gravity conveyor 54 will be carried directly through the openings 52 and 53 onto the loading conveyor. After the loading conveyor 50 has been fully loaded, the articles will be forced from this conveyor to the main conveyor 42 by means of a fluid operated push bar 55. As shown in Fig. 2, this push bar extends throughout the entire length of the loading conveyor and is arranged to move longitudinally of the oven so that when it is moved forwardly into the oven, it will sweep the entire row of articles, positioned upon the loading conveyor off onto the main conveyor. In order to prevent the introduction of articles into the oven while the bar 55 is being operated, I provide a suitable arm 55a mounted upon the bar 55 and positioned so that when the bar is in operation it will serve to obstruct the entrance of any more articles through the opening 52 of the inner lining.

The fluid operating means for the bar 55 will comprise a suitable fluid motor 56, preferably of the piston type. Thus, the motor will be provided with a piston 57 which when subjected to fluid pressures upon its left side, as viewed in the figure, will cause the bar 55 to move so as to force the articles from the loading to the main conveyor and when subjected to fluid pressure upon its right hand side will serve to retract the bar to its normal position so as to permit the introduction of a new charge. The motor 56 will be provided with a suitable source of fluid supply. Thus, as shown, the motor will be provided with a hydraulic reservoir 58 which will serve both to supply the fluid to the motor and to receive the fluid exhaust from the motor. A suitable pump 60 preferably of the centrifugal type will be inserted between the fluid supply source and the motor so as to provide the desired operating pressure. Any suitable means may be provided for operating the pump 60. Thus the motor 61 is provided for this purpose. The fluid pressure will be controlled by a suitable valve 62 which will serve to control the introduction and the exhaust of the fluid to and from the opposite sides of the motor piston. It is believed unnecessary to describe in detail the shape and construction of this valve since it may be of any form suitable for the piston type of fluid motor.

This valve will be suitably controlled so as to time the operation of the pushing bar 55 with respect to the movement of the main conveyor 44. Thus, the valve will be provided with a suitable operating cam 63 which will be mechanically driven from the main conveyor by means of a chain drive 64. It will be understood that this cam will be provided with actuating surfaces which will be so shaped that the valve will be operated so as to cause the motor to move the bar forward to load the conveyor and then to withdraw the bar promptly to its normal position where it will hold the bar for a suitable length of time so as to permit an additional charge to pass upon the loading conveyor. Thus, the fluid motor will be automatically timed with respect to the speed of the main conveyor so as to permit a loading operation as rapid as will be consistent with the movement of the articles through the oven.

It will be understood that the use of a centrifugal pump to create the fluid pressure is of distinct advantage in this construction since the maximum pressure of the pump may be readily controlled. Thus, by properly proportioning the diameter of the hydraulic cylinder to the maximum pressure supplied by the pump all danger of damaging the articles in case they become jammed is eliminated. Thus, if one of the articles has rolled into the oven through the side opening and has not passed entirely through this opening when the push bar 55 has been started forward, it is likely that the article will be caught between the bar and one side of the opening through which it is passing. By limiting the maximum pressure upon the bar to less than that which would cause damage to the article, no damage will be done since the valve will reverse the piston automatically in the normal cycle of operation and the bar will be returned to its normal retracted position. The article which had been caught will continue to move into the oven upon the loading conveyor and on the next forward stroke of the bar will be properly moved onto the main conveyor. Thus, not only will a rapid loading operation be effected but the operation will be inherently safe in that no damage can result to the articles being loaded.

It will be understood, of course, that the valve drive together with the moving parts of the pusher mechanism which are located between the inner and outer linings will be provided with suitable guards to protect them from the insulating rock wool.

In operation, it will be understood that the articles will be loaded in rows upon the main conveyor. The speed with which the main conveyor will be operated will depend upon the intensity of the heating source and the length of the oven. Thus, the cooking or baking period may be accurately timed so as to insure a very uniformly baked product. The articles which have passed through the oven will be moved automatically by the conveyor onto the unloading platform 65 from which they may be removed as desired.

It is to be noted that this conveyor oven will decrease labor cost, increase production, improve the product and increase the plant efficiency.

While I have described my invention as embodied in concrete form and operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:

1. An electric oven comprising heat insulated metallic walls forming a plurality of spaced heating chambers, a separate metallic supporting framework for each of said heating chambers, means securing the walls of each heating chamber intermediate their ends to the supporting framework provided for said chamber so that the portions of said walls on opposite sides of said secured portion are free to expand linearly in opposite directions independently of the remaining chambers, and means providing a gas tight expansion joint between the adjacent chambers comprising a flange projecting outwardly from each abutting end of said chambers and means providing a peripheral gas tight joint for the abutting flanges.

2. An electric oven comprising spaced metallic heat insulated walls forming inner linings for said oven, walls forming an outer lining for said oven, a supporting framework for each of said inner linings, the walls forming said inner linings having intermediate portions fixedly secured to their respective frameworks so that the wall portions on opposite ends of said secured portions are free to expand in opposite directions therefrom, and flexible metallic accordion-like pleated expansion joints between the ends of said inner metallic walls and surrounded by said outer walls for absorbing the linear expansion of the free wall portions of said inner metallic lining.

3. An oven comprising walls forming a plurality of abutting heating chambers, a plurality of stationary frameworks supporting said heating chambers respectively and in spaced relation with each other, flexible metallic expansion joints connecting the end portions of the walls of adjacent heating chambers and means mechanically securing an intermediate portion of the walls of each of said chambers to its stationary supporting frame so that the walls on opposite sides of said secured portion are free to expand in opposite directions, whereby the total linear expansion of each pair of adjacent chambers is absorbed by the expansion joints provided for these chambers.

4. An oven comprising walls forming a heating chamber, a main conveyor for carrying articles through said heating chamber, a loading conveyor for said articles tending to introduce said articles continuously into said chamber, a bar for pushing said articles from said loading to said main conveyor, said bar being provided with an arm positioned so as to prevent the passage of articles into said heating chamber while the pushing bar is in operation and means for operating said bar.

5. An oven comprising walls forming a heating chamber, said chamber being provided with an opening, a loading conveyor positioned crosswise of said heating chamber adjacent said opening so that articles may be conveyed through said opening and onto said loading conveyor, gravitational means for conveying said articles to said loading conveyor, a main conveyor for carrying said articles through said oven, a bar for pushing said articles from said loading to said main conveyor, said bar being provided with a projecting arm positioned so as to prevent the passage of articles through said opening while the pushing bar is in operation and means for intermittently operating said pushing bar.

6. An oven comprising walls forming a heating chamber, a main conveyor for carrying articles through said heating chamber, a loading conveyor for said articles, a push bar for pushing said articles from said loading to said main conveyor, a fluid motor for intermittently operating said push bar, a source of fluid supply for said fluid motor, means for controlling said source of fluid supply and an operable connection between said controlling means and said main conveyor whereby said controlling means is operated in synchronism with said main conveyor.

7. An oven comprising walls forming a heating chamber, continuous conveyor means for carrying articles through said heating chamber, means for introducing said articles to said heating chamber, and means for placing said articles onto said continuous conveyor comprising a push bar, a fluid motor for intermittently operating said push bar, a source of fluid supply for said fluid motor, a pump inserted between said source and said motor for applying a pressure to said motor and means for controlling said motor in accordance with the operation of said conveying means.

8. An oven comprising walls forming a heating chamber, a main conveyor for carrying articles through said heating chamber, a loading conveyor for said articles, a push bar for pushing said articles from said loading to said main conveyor, a fluid motor for intermittently operating said push bar, a source of fluid supply for said fluid motor, a pump inserted between said motor and said fluid source for applying a fluid pressure to said motor, a valve for controlling said fluid pressure and a driving connection between said valve and said main conveyor whereby said valve is operated in synchronism with said main conveyor.

9. An oven comprising walls forming a heating chamber, a main conveyor for carrying articles through said heating chamber, a loading conveyor for said articles, a push bar for pushing said articles from said loading to said main conveyor, a fluid motor for intermittently operating said push bar, a source of fluid supply for said fluid motor, a pump inserted between said motor and said fluid source for applying a fluid pressure to said motor, a motor for operating said pump, a valve for controlling said fluid pressure, a cam for controlling the operation of said valve and a driving connection between said cam and said main conveyor whereby said cam is operated in synchronism with said main conveyor, said cam being provided with surfaces so that said bar will be held in its position out of the path of movement of the incoming articles for a time interval.

10. An electric heating unit for ovens comprising an inverted channel member extending across the oven, pins extending between the sides of said channel member and a heating unit supported by said pins.

11. An electric heating unit for ovens comprising an inverted channel member extending across the oven, a plurality of spaced pins extending between the sides of said channel member and a sheathed heating unit slidably supported on said pins.

12. An oven comprising walls forming a plurality of spaced abutting heating chambers, linear expansion absorbing means interposed between and mechanically connecting the walls of said chambers, a framework for each chamber and means mechanically securing an intermediate portion of each of said chambers to its framework so as to prevent relative movement between the respective secured portions of said chambers and providing for linear expansion of the portions of the walls on opposite sides of the secured portions, whereby the total over-all linear expansion of said oven is limited to the combined linear expansion of the two extreme free end portions of the end sections of said heating chambers.

13. An oven comprising spaced walls forming a plurality of spaced heating chambers, a separate stationary framework supporting the walls forming each of said heating chambers, means securing an intermediate portion of the walls of each heating chamber to its supporting framework so that the end portions of said walls are free to move in opposite directions from said secured portion and whereby the total over-all linear expansion of said oven is limited to the combined linear expansion of the extreme free end portions of the end sections of said heating chamber and flexible accordion-like pleated expansion joints between said heating chambers connected to absorb the thermal expansion of the freely movable portions of said walls.

14. An electric oven comprising spaced walls forming a plurality of spaced abutting heating chambers, a separate stationary framework supporting each of said chambers, each framework having a portion embracing the walls forming its associated chamber, means fixedly securing said embracing portions to the wall portions which they surround and means joining each pair of adjacent ends of said abutting chambers comprising an accordion-like pleated joint providing for the thermal expansion of the portion of said walls between said fixed portions.

In witness whereof, I have hereunto set my hand this 25th day of March, 1929.

JACOB L. SHROYER.